United States Patent [19]

Mayer et al.

[11] 3,893,869

[45] July 8, 1975

[54] MEGASONIC CLEANING SYSTEM

[75] Inventors: Alfred Mayer, Plainfield; Stanley Scwartzman, Somerville, both of N.J.

[73] Assignee: RCA Corporation, New York, N.Y.

[22] Filed: May 31, 1974

[21] Appl. No.: 475,173

[52] U.S. Cl. .................................... 134/86; 134/184
[51] Int. Cl. ................................................ B08b 3/04
[58] Field of Search ............................ 134/1, 84–86, 134/88–89, 94, 184

[56] References Cited

UNITED STATES PATENTS

| | | | |
|---|---|---|---|
| 2,546,385 | 3/1951 | Christina | 134/94 X |
| 3,165,049 | 1/1965 | Dick | 134/85 X |
| 3,229,702 | 1/1966 | Murdoch, Jr. | 134/89 |
| 3,354,495 | 11/1967 | Lawrence | 134/84 X |
| 3,527,607 | 9/1970 | Antonevich | 134/184 X |
| 3,542,592 | 11/1970 | Zweig | 134/1 |
| 3,640,295 | 2/1972 | Peterson | 134/1 X |

FOREIGN PATENTS OR APPLICATIONS

| | | | |
|---|---|---|---|
| 526,057 | 6/1931 | Germany | 134/89 |

*Primary Examiner*—Robert L. Bleutge
*Attorney, Agent, or Firm*—H. Christoffersen; A. I. Spechler

[57] ABSTRACT

A megasonic (ultrasonic in the neighborhood of 1 MHz) cleaning system comprises means for cleaning, rinsing, drying, and storing articles in a clean protected ambience. Articles, having surfaces to be cleaned, are immersed in a cleaning fluid wherein a transducer oscillates at a frequency in the range of between about 0.2 and 5 MHz. The transducer propagates a beam of ultrasonic energy in a direction substantially parallel to the surfaces of the articles to be cleaned. After cleaning, the articles are rinsed and dried in filtered air at a temperature of between about 25°C and 300°C.

9 Claims, 3 Drawing Figures

MEGASONIC CLEANING SYSTEM

This invention relates generally to a megasonic cleaning system. More particularly, the invention relates to a method of, and apparatus for, cleaning a surface of an article with ultrasonic energy in the megahertz range. The novel method and apparatus are particularly useful for cleaning the surfaces of semiconductor wafers in preparation for subsequent operations in the manufacture of semiconductor devices.

The removal of minute particles of dirt and grease from a surface is one of the most difficult operations in the manufacture of semiconductor devices, photomasks, and the like. Most small particles of dust, dirt, and grime are held tenaciously onto the surface, requiring a relatively large force to remove them. In the preparation of semiconductor devices, such as silicon vidicon targets, for example, brushes of synthetic material are used to remove dirt particles from the devices. Also, in the preparation of a silicon wafer for an epitaxial deposition of silicon thereon, it is customary to scrub the surface of the wafer manually with a wad of cotton moistened with a cleaning fluid. Such a process for cleaning is not very efficient because the particles of grit that are removed can redeposit themselves easily and can scratch the surface. The manual cleaning of wafers is also relatively time consuming since only one wafer can be cleaned at a time.

Another prior-art method of cleaning a surface of a wafer of silicon includes immersing the wafer in a hot sulfuric acid-hydrogen peroxide solution. This method, however, is successful only when the dust and dirt particles are of an organic origin and the compounds to be removed are soluble in the solution or chemically attacked by it.

It has also been proposed to remove very small particles of matter from silicon wafers by conventional ultrasonic cleaning methods, but these methods have not been successful. The main reason for this lack of success is believed to be the fact that commerically available ultrasonic cleaning apparatus have transducers that operate at relatively low frequencies, in the range of between about 20 and 90 KHz.

Briefly, the aforementioned disadvantages of the prior-art cleaning methods are substantially overcome by the novel megasonic cleaning system of the present invention. The novel megasonic cleaning system comprises means for immersing an article, having a surface to be cleaned, in a container of cleaning fluid. A transducer, adapted to oscillate at a frequency in the range of between about 0.2 and 5 MHz, is disposed within the container and positioned so as to produce a beam of ultrasonic energy substantially parallel to the surface to be cleaned. When cleaned, the article is removed from the container and rinsed in a liquid rinse. The article is then dried in clean air at a temperature of between about 25° and 300°C.

In a preferred embodiment of the novel megasonic cleaning system, the operations of cleaning, rinsing, and drying articles are carried out in a dust-free ambience.

In another embodiment, a plurality of surfaces of the articles to be cleaned are disposed substantially parallel to each other and substantially parallel to the beam of ultrasonic energy.

In still another embodiment, relative motion is produced between the beam of ultrasonic energy and the surfaces to be cleaned.

In a further embodiment, a plurality of ultrasonic transducers are employed. The articles with surfaces to be cleaned are disposed on opposite sides of the transducers, and relative motion is provided between the propagated beams of ultrasonic energy and the articles.

The novel megasonic cleaning system will be described with the aid of the following drawings wherein.

Figure 1:
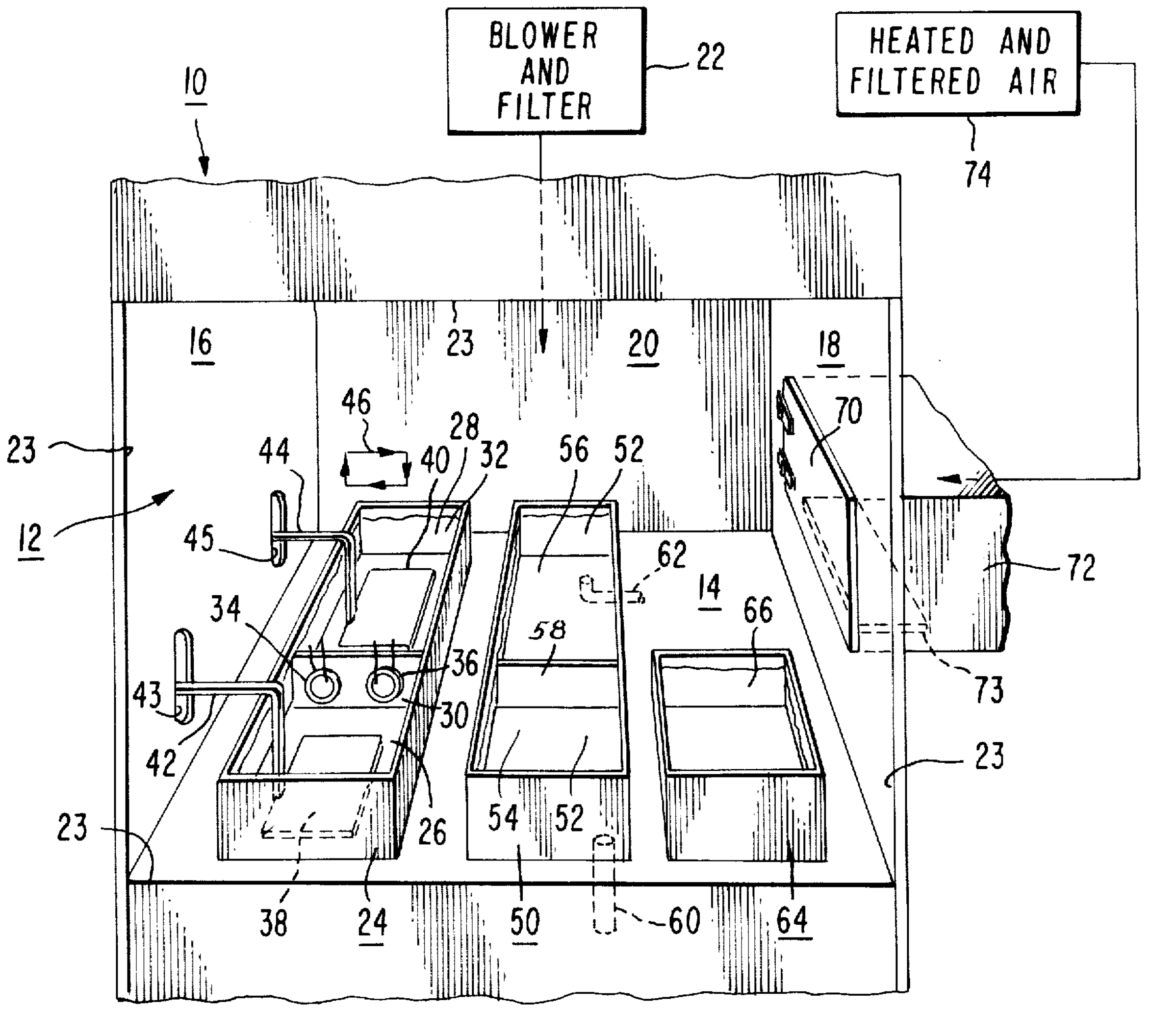
FIG. 1 is fragmentary perspective view, partly schematic, of the apparatus for carrying out the operations of the megasonic cleaning system.

Referring now to FIG. 1 of the drawing, there is shown one embodiment of the novel megasonic cleaning system 10 comprising a hood or a compartment 12, having a floor 14, opposite side walls 16 and 18, and a rear wall 20. Blower and air filter apparatus 22 communicates with the upper portion of the compartment 12 to maintain the air pressure within the compartment 12 slightly higher than that in the ambience. Thus, there is provided a laminar flow of clean air through the front opening 23 of the compartment 12, from within the compartment 12 and into the ambience.

Cleaning means are provided within the compartment 12. To this end, a cleaning container 24 is disposed on the floor 14 of the compartment 12 adjacent to the wall 16. The container 24 is divided into two portions 26 and 28 by a septum 30. The septum 30 is not as high as the walls of the container 24, and a cleaning fluid 32 is placed in both of the portions 26 and 28 of the container 24.

Means are provided to propagate beams of ultrasonic energy in the cleaning fluid 32. To this end, a pair of transducers 34 and 36 are supported in openings in the septum 30, by any suitable means. The transducers 34 and 36 are commerically available and comprise, for example, glass-coated cobalt barium titonate material, having silver electrodes. The transducers 34 and 36 are capable of oscillating at a frequency of between about 0.2 and 5 MHz when energized by a suitably tuned high frequency power supply, say one having an input of about 5–15 Watts/cm$^2$ of transducer surface. The transducers 34 and 36 are discshaped objects and are disposed in the septum 30 to propagate beams of ultrasonic energy substantially perpendicularly to the septum 30. Since the septum 30 divides the container 24 into the two portions 26 and 28, and the transducers 34 and 36 communicate with both of the portions 26 and 28, they propagate beams of energy in the cleaning fluid 32 in both of the portions 26 and 28.

Similar article supporting means are disposed within each of the portions 26 and 28 of the container 24 to hold articles to be cleaned. Thus, platforms 38 and 40, supported by brackets 42 and 44, are disposed within the portions 26 and 28, respectively, of the container 24. The brackets 42 and 44 are connected to rotary (reciprocating) apparatus and cams (not shown), well known in the art, through openings 43 and 45, respec- :ively in the side wall 16 for moving the platforms 38 and 40 in a substantially rectangular path, as indicated by the rectangular arrow diagram 46, for the purpose hereinafter appearing.

A rinsing container 50 for a rinsing fluid 52 is disposed on the floor 14 of the compartment 12 adjacent to the cleaning container 24. The rinsing container 50 is also divided into two portions 54 and 56 by a septum 58 whose height is less than that of the walls of the rinsing container 30. The rinsing fluid 52 is introduced into the portion 54 of the container 50 through an inlet pipe 60. The rinsing fluid 52 flows into the portion 56 of the container 50 by flowing over the septum 58, and the rinsing fluid 52 is removed from the portion 56 through an outlet pipe 62. With the arrangement described, the rinsing fluid 52 can run continuously into the portion 54, overflow into the portion 56, and then empty through the outlet pipe 62.

Another cleaning container 64 is disposed on the floor 14 of the compartment 12 adjacent to the rinsing container 50. The cleaning container 64 is for a cleaning fluid 66 different from the cleaning fluid 32 in the cleaning container 24. Thus, for cleaning wafers of silicon, for example, the cleaning fluid 32 in the container 24 may comprise a solution of water, hydrogen peroxide, and ammonia in the ratios of 4:1:1, by volume; and the cleaning fluid 66 in the container 64 may comprise a solution of water, hydrogen peroxide, and hydrochloric acid in the ratios of 4:1:1, by volume. Means (not shown) for filtering the cleaning solutions on a continuous basis may be provided to avoid an accumulation of foreign particles in the solutions.

Means for drying the articles that have been cleaned are provided in the megasonic cleaning system 10. To this end, a door 70 is hinged to the side wall 18 of the compartment 12 to cover an opening in the side wall 18. The door 70 is for a drying compartment 72 that is provided with heated and filtered air for drying the articles that have been cleaned. A horizontal shelf 73 is fixed to the lower part of the door 70 for holding cleaned articles that are to be dried. Suitable air heating, filtering, and blowing apparatus 74 communicates with the compartment 72 to provide clean air at temperatures ranging between about 25° and 300°C. The apparatus 74 is constructed to provide an air velocity of about 3 meters/second. At this velocity the air blows liquid droplets from wafers very quickly. The surface moisture is dried by heated air, preferably over 100°C. For wafers having a diameter of 75 mm and spaced 3 mm apart in a suitable holder, the total drying cycle takes between 1.5 and 3 minutes. It will be seen from FIG. 1 that the operations of cleaning, rinsing, and drying of articles can be performed within the compartment 12 while the compartment 12 is kept clean and dust free by a laminar flow of air from the compartment 12 into the ambience.

The drying operation may also be performed by a spin dryer (not shown) disposed within the compartment 12.

Figure 2:
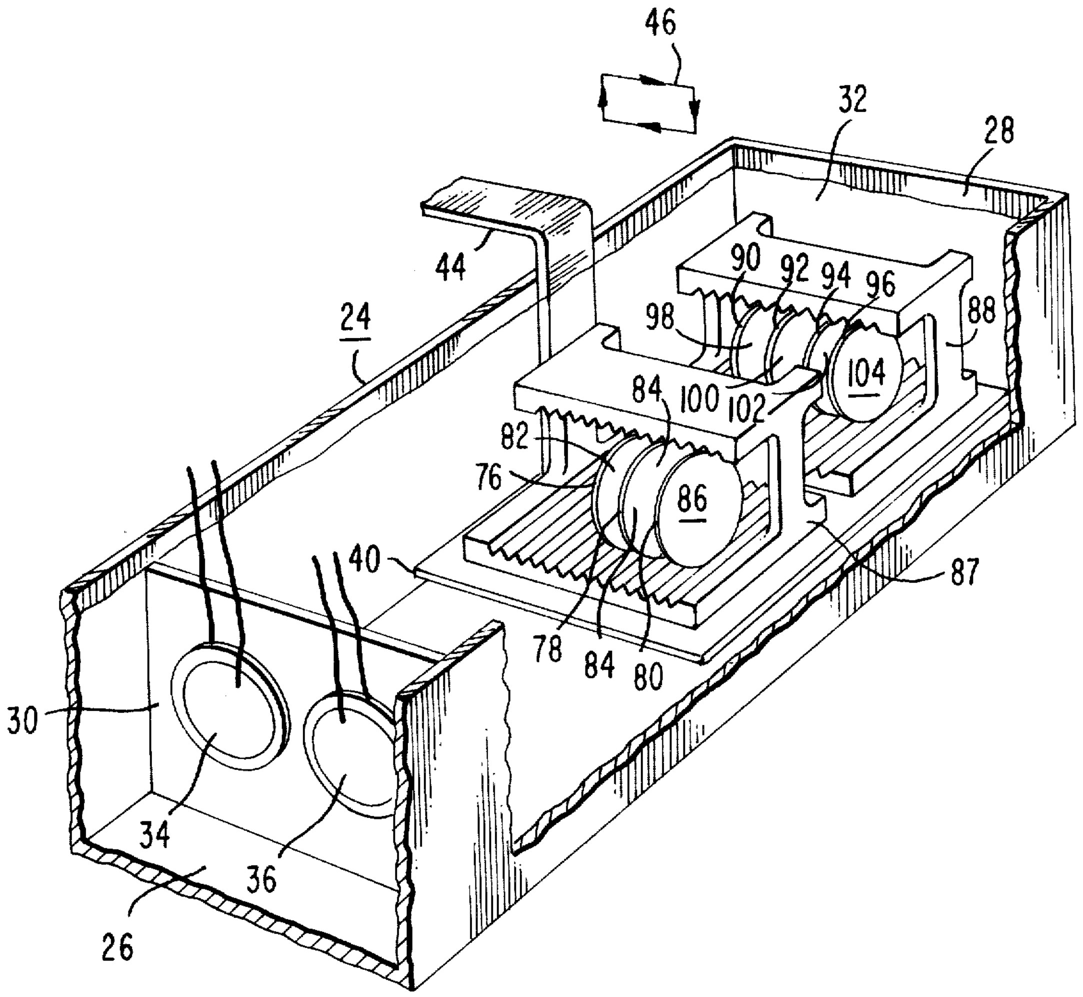
FIG. 2 is an enlarged, fragmentary perspective view of a portion of the apparatus shown in FIG. 1, with parts broken away, and illustrating semiconductor wafers disposed in a container for the cleaning operation.

The operation of the megasonic cleaning system 10 will be described by way of cleaning the surfaces of a plurality of similar articles, such as wafers of silicon. Referring now to FIG. 2, there are shown silicon wafers 76, 78 and 80 whose surfaces 82, 84 and 86, respectively are to be cleaned. The wafers 76, 78 and 80 are disposed parallel to each other in article holding means, such as a wafer holder 87. The holder 87 can be made of a suitable plastic material, or of quartz or glass or an inert metal, with the inner walls of its opposite sides formed with a plurality of grooves to hold the wafers 76, 78 and 80 in parallel alignment therein. In order to insure thorough cleaning of the wafer surfaces, the flow of cleaning solution (or drying air) should be impeded as little as possible by the wafer holder 87. Thus, the wafer holder 87 can be a commercially available wafer holder that has been modified (by removing portions of its wall) to permit liquid (and air) to flow through freely. While only three wafers are shown positioned in the holder 87, a much greater number can be held. The spacing, in the holder 87, between silicon wafers commonly used in electronic device manufacture may range from between about 0.05 and 0.25 inches (0.125–0.625 cm) and are compatible with wafer transfer systems well known in the art.

The holder 87 is disposed on the platform 40 in the portion 28 of the cleaning container 24. The surfaces 82, 84 and 86 of the wafers to be cleaned are disposed substantially parallel to each other and parallel to the beams of ultrasonic energy propagated by the transducers 34 and 36.

Another wafer holder 88 for a plurality of wafers 90, 92, 94 and 96 whose surfaces 98, 100, 102 and 104, respectively, are to be cleaned is also disposed on the platform 40. The surfaces 98, 100, 102 and 104 are substantially parallel to the surfaces 82, 84, and 86 and disposed so that beams of ultrasonic energy from the transducers 34 and 36 can pass between the wafers. The portion 28 of the container 24 is filled with the cleaning fluid 32, and the platform 40 is moved in the rectangular path 46, in the direction indicated by the arrows. In this manner, all of the wafers in the holders 87 and 88 are subjected to the beams of ultrasonic energy from the energized transducer 34 and 36.

The wafers 76, 78 and 80 and 90, 92, 94 and 96 are subjected to the beams of ultrasonic energy at frequencies in the range of between about 0.2 and 5 MHz for between 3 seconds and 60 minutes, depending upon the power of energization of the transducers 34 and 36. A frequency of about 0.8 MHz has been found to be satisfactory for cleaning silicon wafers. Since the transducers 34 and 36 are limited in size, the rectangular motion imparted to the platform 40 during the cleaning process insures that all of the wafers within the holders 87 and 88 will be cleaned.

A set of wafer holders similar to those in the portion 28 may be disposed in the portion 26 of the cleaning container 24 during the cleaning process. This follows from the fact that the transducers 34 and 36 communicate with both of the portions 24 and 28 of the cleaning container 24. Contrary to expectation the wafers can be cleaned well when the beam of ultrasonic energy is directed substantially parallel to the principal surfaces of the wafer. Consequently, since there is substantially very little attenuation of the beams of ultrasonic energy from the transducers 34 and 36 as they pass between the silicon wafers undergoing cleaning, two or more loaded wafer holders can be disposed on each of the platforms 38 and 40, in the manner described, whereby a relatively great number of wafers may be cleaned simultaneously.

Figure 3:
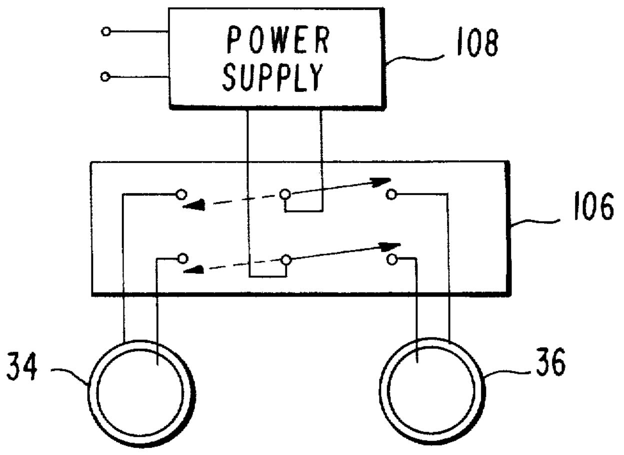
FIG. 3 is a schematic diagram of a switching system for operating two ultrasonic transducers in the novel megasonic cleaning system.

Referring now to FIG. 3, there is shown a schematic diagram for operating the transducers 34 and 36 so as to provide relative motion between a beam of ultrasonic energy and articles disposed in the cleaning container 24. Each of the transducers 34 and 36 is connected to a stepping switch 106 which, when energized and provided with energy from a suitable power supply 108, will provide beams of ultrasonic energy alternately from the transducers 34 and 36. Thus, articles with surfaces to be cleaned need only be disposed within the cleaning container 24 with their surfaces parallel to the direction of the propagation of the energy beams from the transducers 34 and 36. The relative motion between the alternating beams and the surfaces to be cleaned obviates the necessity for reciprocating the platforms 38 and 40.

After the cleaning operation in the cleaning container 24, the loaded wafer holders 87 and 88 are removed from the cleaning fluid 32 with suitable tongs or handles (not shown) and rinsed in the rinse fluid 52 in the portion 54 of the rinse container 50.

Under certain conditions, as where organic materials have to be removed from the surfaces to be cleaned, for example, the articles can be immersed in the cleaning fluid 66 in the cleaning container 64 until cleaned. After this cleaning process, the cleaned articles are again rinsed in the portion 54 of the rinse container 50.

The cleaned articles are dried by placing them within the compartment 72 supplied with heated and filter air. The articles, still within their holders, such as wafers in the holders 87 and 88, can be placed upon the shelf 73 within the drying compartment 72 until dried. The temperature of the filtered air may be controlled between 25° and 300°C, depending upon the articles to be dried.

Thus, there has been described and illustrated a megasonic cleaning system for cleaning surfaces of articles. The apparatus provides means by which a plurality of surfaces of articles can be cleaned simultaneously and wherein the operations of cleaning, rinsing, and drying can be carried out in a dust-free compartment. When the cleaned articles are dried, they can also be stored in suitable containers until needed for further processing. While the novel megasonic cleaning system has been described with the cleaning of semiconductor wafers, the novel megasonic cleaning system may also be used for cleaning the surfaces of many other types of articles, such as stripping photoresists from photomasks, and the like. Of course, the cleaning fluids will vary with the type of material to be removed from the surfaces of the articles to be cleaned.

What is claimed is:

1. Apparatus for cleaning a surface of an article comprising:

a dust-free compartment having an opening communicating with the ambience, air pressure means cooperatively associated with said compartment to maintain air pressure within said compartment slightly higher than in said ambience, whereby a laminar flow of air proceeds from said compartment into said ambience, a first container for a first cleaning fluid for said article, a transducer adapted to oscillate at a frequency of between 0.2 and 5 MHz for propagating a beam of ultrasonic energy along a predetermined direction disposed in said first container, means within said first container for disposing said article with said surface substantially parallel to said propagated beam within said first container, means for a liquid rinse for rinsing said surface of said article after it is removed from said first container, and means communicating with said compartment for drying said article when removed from said liquid rinse.

2. Apparatus for cleaning a surface of an article as described in claim 1, wherein:

a second container for a second cleaning fluid is disposed within said compartment.

3. Apparatus for cleaning a surface of an article as described in claim 1, wherein:

means dispose said transducer within said first container so as to divide said first container into two separate portions, and said transducer communicates with each of said portions.

4. Apparatus for cleaning a surface of an article as described in claim 1, wherein:

means are cooperatively associated with said first container to provide relative motion between said article and said transducer while maintaining said surface of said article substantially parallel to the direction of said propagated beam.

5. Apparatus for cleaning surfaces of a plurality of articles comprising:

a compartment having an opening communicating with the ambience, air pressure means cooperatively associated with said compartment to maintain air pressure within said compartment higher than in said ambient, whereby to create a laminar flow of air from said compartment into said ambience, first container means within said compartment for a first cleaning fluid, a plurality of ultrasonic transducers within said first container means each of said transducers being disposed to propagate a beam of ultrasonic energy, when energized, in the same direction, holder means for disposing said articles within said first container means with said surfaces substantially parallel to each other and also substantially parallel to said beams, means to energize said transducers to oscillate at a frequency between about 0.2 and 5 MHz, rinsing means disposed within said compartment for rinsing said articles after they are removed from said first container means, and drying means communicating with said compartment for drying said articles after they have been rinsed.

6. Apparatus for cleaning surfaces of a plurality of articles as described in claim 5, wherein:

said first container means has opposite end walls, and said plurality of transducers are disposed intermediate said opposite end walls, whereby separate holder means can be disposed on opposite sides of said transducers.

7. Apparatus for cleaning surfaces of a plurality of articles as described in claim 5, wherein:

means are cooperatively associated with said first container means, said holder means, and said plurality of transducers to provide relative motion between said surfaces of said articles and said beams.

8. Apparatus for cleaning surfaces of a plurality of articles as described in claim 7, wherein:

said means cooperatively associated with said first container means comprises a platform disposed within said first container means for supporting said holder means, and means coupled to said platform for moving it through said beams, whereby to expose all of said surfaces to be cleaned to at least some of said beams.

9. Apparatus for cleaning surfaces of a plurality of articles as described in claim 7, wherein:

said means cooperatively associated with said first container means comprise means to operate said plurality of transducers selectively to expose all of said surfaces to at least one of said beams.

* * * * *

REEXAMINATION CERTIFICATE (922nd)

United States Patent [19] | [11] B1 3,893,869

Mayer et al. | [45] Certificate Issued Sep. 27, 1988

[54] MEGASONIC CLEANING SYSTEM

[75] Inventors: Alfred Mayer, Plainfield; Stanley Scwartzman, Somerville, both of N.J.

[73] Assignee: RCA Corporation, New York, N.Y.

Reexamination Request:
No. 90/000,972, Mar. 19, 1986

Reexamination Certificate for:
Patent No.: 3,893,869
Issued: Jul. 8, 1975
Appl. No.: 475,173
Filed: May 31, 1974

[51] Int. Cl.⁴ ........ B08B 3/04
[52] U.S. Cl. ........ 134/86; 134/184
[58] Field of Search ........ 134/1, 84–86, 134/88, 89, 94, 184

[56] References Cited

U.S. PATENT DOCUMENTS 2,702,260 2/1955 Massa ........ 134/1
3,535,159 10/1970 Shiro ........ 134/1
3,627,278 12/1971 Dee ........ 259/72
3,640,295 2/1976 Peterson ........ 135/159
3,728,154 4/1973 Suzuki ........ 134/3

FOREIGN PATENT DOCUMENTS 46-7105 3/1971 Japan .

OTHER PUBLICATIONS

Spring, "Metal Cleaning," Reinhold Publishing Corp. pp. 82–93 (1963).
Dawe Digest (Gr. Britain), "Ultrasonic Cleaning in the Lucas Group," vol. 13, No. 4, pp. 3–4 (1970).

*Primary Examiner*—Timothy F. Simone

[57] ABSTRACT

A megasonic (ultrasonic in the neighborhood of 1 MHz) cleaning system comprises means for cleaning, rinsing, drying, and storing articles in a clean protected ambience. Articles, having surfaces to be cleaned, are immersed in a cleaning fluid wherein a transducer oscillates at a frequency in the range of between about 0.2 and 5 MHz. The transducer propagates a beam of ultrasonic energy in a direction substantially parallel to the surfaces of the articles to be cleaned. After cleaning, the articles are rinsed and dried in filtered air at a temperature of between about 25° C. and 300° C.

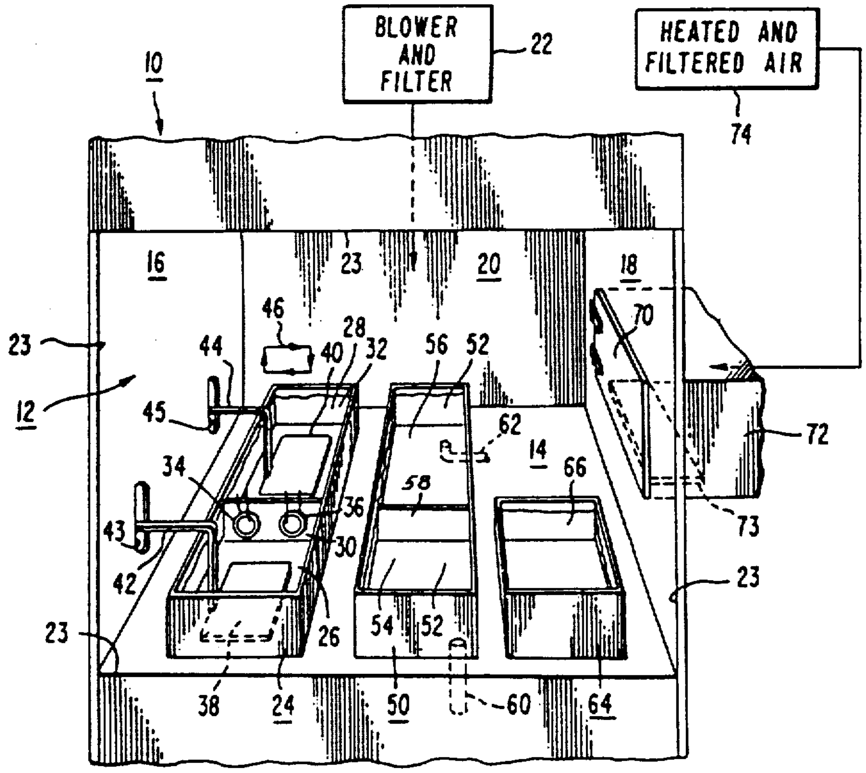

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 6, and 9 is confirmed.

Claims 1, 2, 4, 5, 7 and 8 are cancelled.

3. Apparatus for cleaning a surface of an article as described in claim 1, wherein:

means dispose said transducer within said first container so as to divide said first container into two separate portions, and said transducer communicates with each of said portions.

* * * * *